United States Patent

[11] 3,614,239

| [72] | Inventor | Kenneth E. Kissell<br>Dayton, Ohio |
|---|---|---|
| [21] | Appl. No. | 30,424 |
| [22] | Filed | Apr. 21, 1970 |
| [45] | Patented | Oct. 19, 1971 |
| [73] | Assignee | The United States of America as represented by the Secretary of the Air Force |

[54] PHOTOELECTRIC SPACE-OBJECT POSITION MEASURING DEVICE
11 Claims, 8 Drawing Figs.

[52] U.S. Cl. .................................................. 356/152, 250/203, 250/233
[51] Int. Cl. ..................................................... G01b 11/26
[50] Field of Search .......................................... 356/152; 250/203, 233

[56] References Cited

UNITED STATES PATENTS

| 3,357,298 | 12/1967 | Beall, Jr. ........................ | 250/203 |
| 3,000,255 | 9/1961 | Iddings ........................... | 250/203 |

FOREIGN PATENTS

| 1,270,502 | 7/1961 | France .......................... | 356/152 |

Primary Examiner—Richard A. Farley
Assistant Examiner—S. C. Buczinski
Attorneys—Harry A. Herbert, Jr. and Arthur R. Parker ABSTRACT: Satellite-position determining means for accurately locating the position of a spacecraft in near-earth orbit consisting of a satellite-tracking telescope; a first, fixed, star-detecting masking element mounted at the telescope focus, and including a central aperture and a plurality of slits formed in an M-shaped configuration for sequentially passing light from background stars to a first photomultiplier; and a second, rotatable, transparent disc element mounted at the central aperture and incorporating opaque radial and spiral bands for sequentially interrupting light passing from the satellite to a second photomultiplier. From the average time of the inner light pulses and the outer light pulses resulting from starlight received at the first photomultiplier, and the proportional time interval between the passage of starlight by the inner slits and the outer slits, the instant at which the image of the star passed midway through the M-configuration and the lateral location thereof relative to the ends of the slits may be computed. Then, by noting the elapsed time between the interruptions of light from the target-satellite to the second photomultiplier, the exact position of the satellite relative to the already-determined position of the star may likewise be computed.

INVENTOR.
KENNETH E. KISSELL

PHOTOELECTRIC SPACE-OBJECT POSITION MEASURING DEVICE

BACKGROUND OF THE INVENTION

This invention relates generally to the field of satellite-tracking technology and, in particular, to a precise means of accurately locating the orbital position of the satellite by reference to the known positions of background stars.

In the art of predicting the future movements of satellites in near-earth orbits, particularly those vehicles not equipped with cooperative beam transponders and/or orbiting at relatively high altitudes where skin-tracking by pencil beam radars becomes rather difficult, a principal problem involved therewith has been the relative inability to obtain precise measurements in a real-time mode and in a reasonable time period. In this regard, present methods of locating the orbital positions of earth satellites have included the use of both tracking and ballistic-type cameras. The former have been of a relatively large size with diameters, for example, of 20-24 inches. These cameras may be used to photograph and record satellites having, for example, a brightness level of $+12$ to $+13$ steller magnitudes, provided great care is exercised in their operation. With the utilization of such cameras, the orbital positions of satellites may be determined, with respect to the position of a known background star, to within an accuracy of $+2$ to $+3$ arc seconds, provided, however, the position of the star, recorded at the same time on the same film, can be determined to an accuracy of 1 -2 arc seconds.

With the use of the above-described cameras, however, the exposed film must be processed, dried and measured by a precision coordinate measuring machine to locate the target-satellite image relative to the positions of some 8–12 identifiable navigation stars. In this connection, a quick result can be obtained within an hour by comparing the photograph with a star map, an accuracy of only $\pm 60$ arc seconds is achieved. To obtain the most accurate or so called ultimate accuracy, the exposed film must be flown to a central data reduction center where the previously noted precision coordinate measuring machines are located. This method requires approximately 1 month before useful data can be obtained. It is noted that the previously described quick method of securing data, which is obtainable within about 1 hour, is some 20 times less accurate than is the ultimate data achieved by the latter-described technique. Even if the aforementioned precision coordinate measuring machine were actually located at the camera site, a period of from 1 to several hours would still be required before the 2–3 second data would be available.

For large bright satellites, the tracking camera can be made less complex and can even be fixed in position. With both types of cameras; namely, the tracking and the fixed cameras, satellite positions within an accuracy of $\pm 2$–5 arc seconds can be achieved, provided, however, considerable care is exercised in measuring the satellite and star image positions on the photographic plate. Moreover, it is essential to establish, with a high degree of accuracy, the exact time that certain events have occurred, such as the interruptions of the camera shutter in front of the film or plate, or the discharge of a short duration lamp on the orbiting spacecraft itself. In this connection, however, the use of such tracking and fixed cameras has resulted in inaccurate spacecraft position determinations, in actual practice, when the vehicle being observed has been overly bright. The latter phenomenon results in the formation of too large an image being photographed on the film due to the spreading of light thereon, which makes it extremely difficult, if not impossible, to accurately locate the exact center of the image.

Other methods presently used to locate spacecraft in earth orbit in real-time measurements have involved the use of pencil beam radars, the accuracy of which, however, have usually only been within $\pm 500$ seconds of arc in angle. In some instances, accuracies within $\pm 200$ arc seconds have been achieved where the range and the component along the line of sight have been measured. Even then, excessive time is required for the completion of numerous computations and the accumulation of considerable data.

The problems and time involved in the aforementioned camera techniques of determining the orbital position of an earth satellite are considerably alleviated and, in some instances, entirely eliminated by the improved method of the present invention, as will become readily apparent from the following summary and detailed description thereof.

SUMMARY OF THE INVENTION

The present invention consists briefly in a novel earth satellite-position determining system that includes in unique combination a tracking telescope and a combined star and satellite-target-detecting assembly mounted to the telescope at the focus thereof. This combined assembly comprises a first, fixed opaque masking element having a central aperture and a series of slits arranged in a M-shaped configuration adapted to sequentially intercept and pass star light to a first, photomultiplier detector; and a second, rotatable, transparent occulter disc element positioned at the central aperture of said first, masking element and incorporating opaque radial and spiral bands sequentially interrupting light reflected from the target-satellite and being normally passed to a second photomultiplier detector. The average time of the inner light pulses and the outer light pulses resulting from the respective interceptions and passage of star light through the M-shaped series of slits in the first, masking element determines the precise instant at which the image of a background star near the orbiting satellite has arrived midway through the M-shaped configuration. Then, by calculating the proportional time interval occuring between the star light passing through the inner and outer slits, the precise lateral location of the star relative to the ends of the slits may be determined. Finally, by computing the time elapse between the interceptions of light reflected from the satellite by the opaque radial and spiral bands on the rotating, occulter disc element, the exact position of the satellite image on the spiral band, which lies within, or adjacent to, the central aperture, may be easily computed by known computational methods. Thereafter, its exact orbital location relative to the already-determined position of the star image on the M-slit configuration may be easily measured.

Further advantages, as well as objects, of the present invention will appear from the following disclosure thereof, taken in connection with the accompanying drawings, in which:

BRIEF DESCRIPTION OF THE DRAWINGS

FIGS. 2a and 2b represent alternative arrangements of the slit configuration;

FIg. 5 shows a block diagram of a data recording system adapted to be used with the invention.

DESCRIPTION OF THE PREFERRED EMBODIMENT

Figure 1:
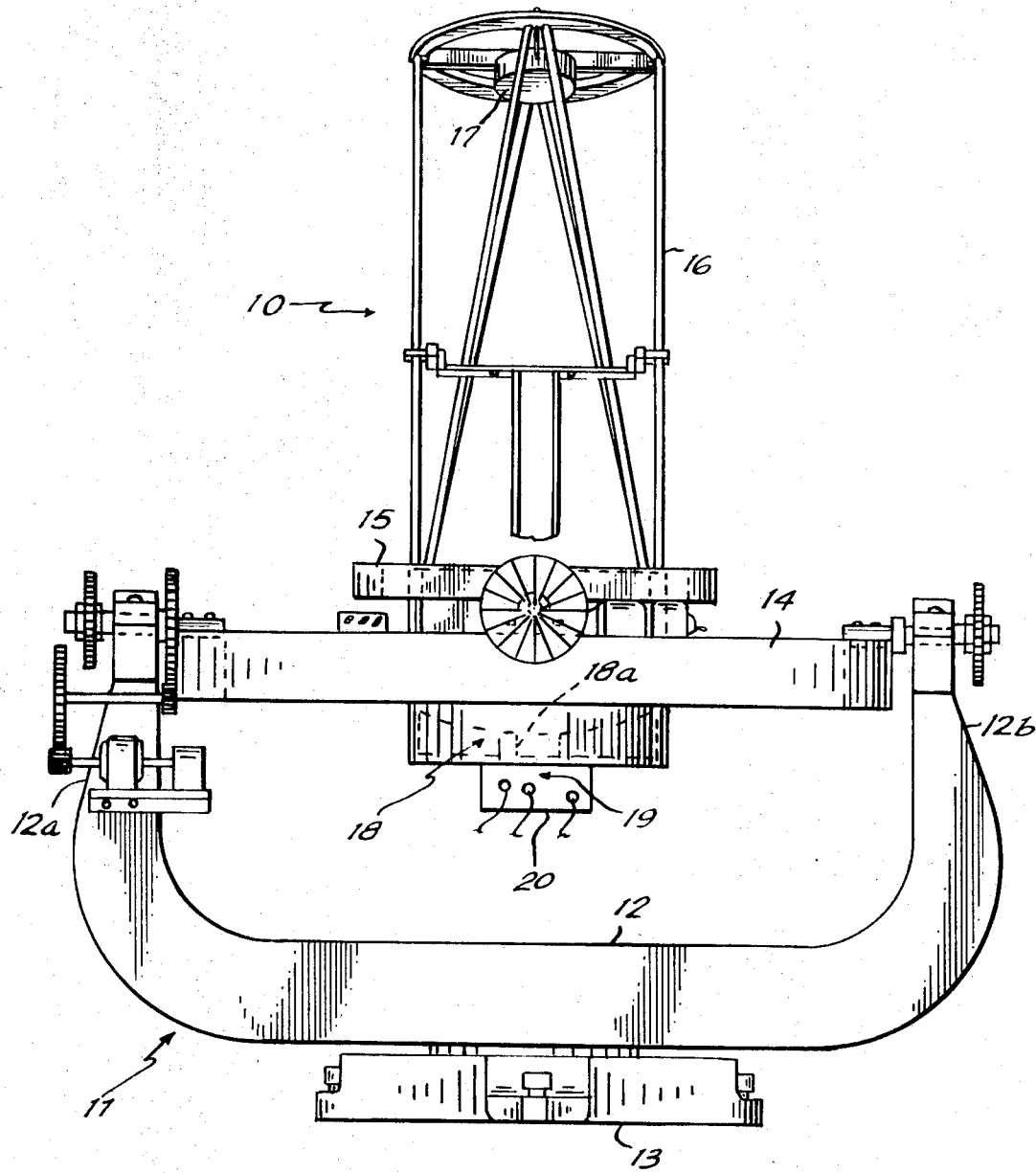
FIG. 1 is a front elevational view of one type of satellite-tracking telescope utilizable with the novel star and target-detecting assembly of the present invention.

Referring generally to the drawing and, in particular, to FIG. 1 thereof, one form of a satellite-tracking telescope utilizable with, and forming part of the present invention, is indicated generally at 10. Although other tracking telescopes may, of course, be used without departing from the true spirit or scope of the invention, the telescope 10 actually shown is that used with applicant's improved "Four-Axis Satellite-Tracking Mount," described and claimed in Pat. application Ser. No. 629,874, filed Apr. 6, 1967, and issued on Sept. 2, 1969 as Pat. No. 3,464,116. The aforesaid telescope 10 may be mounted, as shown, on the improved tracking mount indicated generally at 11. The latter consists of a main yoke member 12 having a pair of spaced-apart upright support elements 12a and 12b and being rotatable about a first, vertical axis through a fixed base member 13 for adjustment in azimuth, an outer gimbal member 14 rotatably mounted on said pair of upright support elements 12a, 12b for adjustment in elevation about a second axis orthogonal to said first, vertical axis, and an inner gimbal member 15 mounted to, and within, said outer gimbal member 14 for adjustment about a third, tracking axis orthogonal to said second, elevation axis. The aforementioned tracking telescope 10 is further mounted within said inner gimbal member 15 on a fourth axis orthogonal to said third, tracking axis for still further and finer adjustment in its tracking of a satellite in earth orbit. Said tracking telescope 10 may further consist of a skeleton or open-frame supporting member 16 which, as is clearly seen in the aforesaid FIG. 1, is suitably braced and thereby supports therewithin a pair of mirrors that may consist of an upper, secondary slightly convex mirror 17 and a bottom, concave primary mirror 18. Thus, as is the usual situation with this type of telescope, light reflected from, and representing the image of, an orbiting earth satellite, such as that depicted schematically at the reference numeral 24 in FIG. 2, and upon which the telescope 10 may be aimed, initially strikes, and is reflected from, the aforesaid bottom, primary mirror 18, to the upper, secondary mirror 17, from whence it is again reflected to a focus at 19 slightly behind the said primary mirror 18 by way of a central opening 18a incorporated therewithin.

Figure 2:
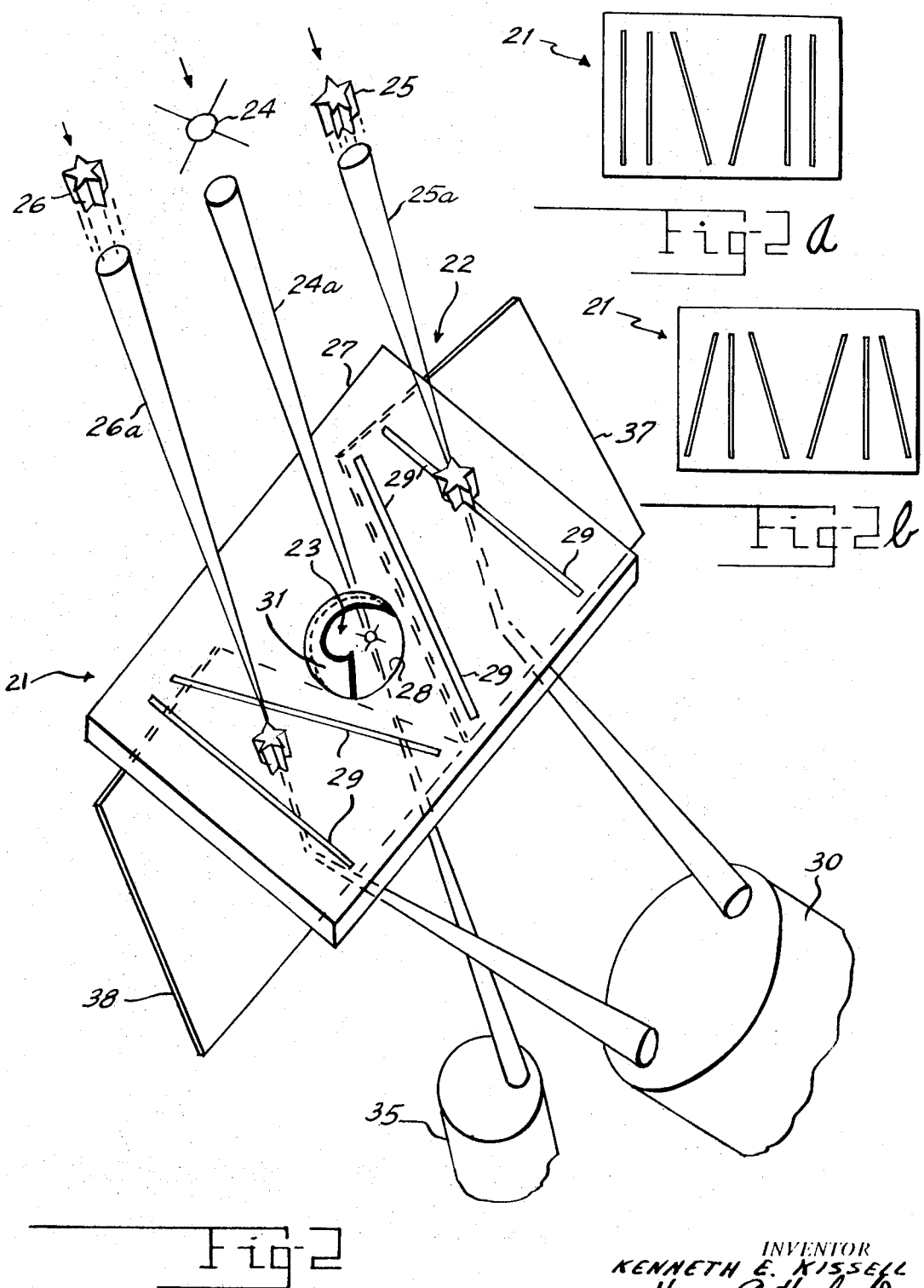
FIG. 2 is a schematic and partially broken-away top perspective view, particularly illustrating specific details of the unique star-detector portion of the overall detecting assembly of the invention.
Figure 3:
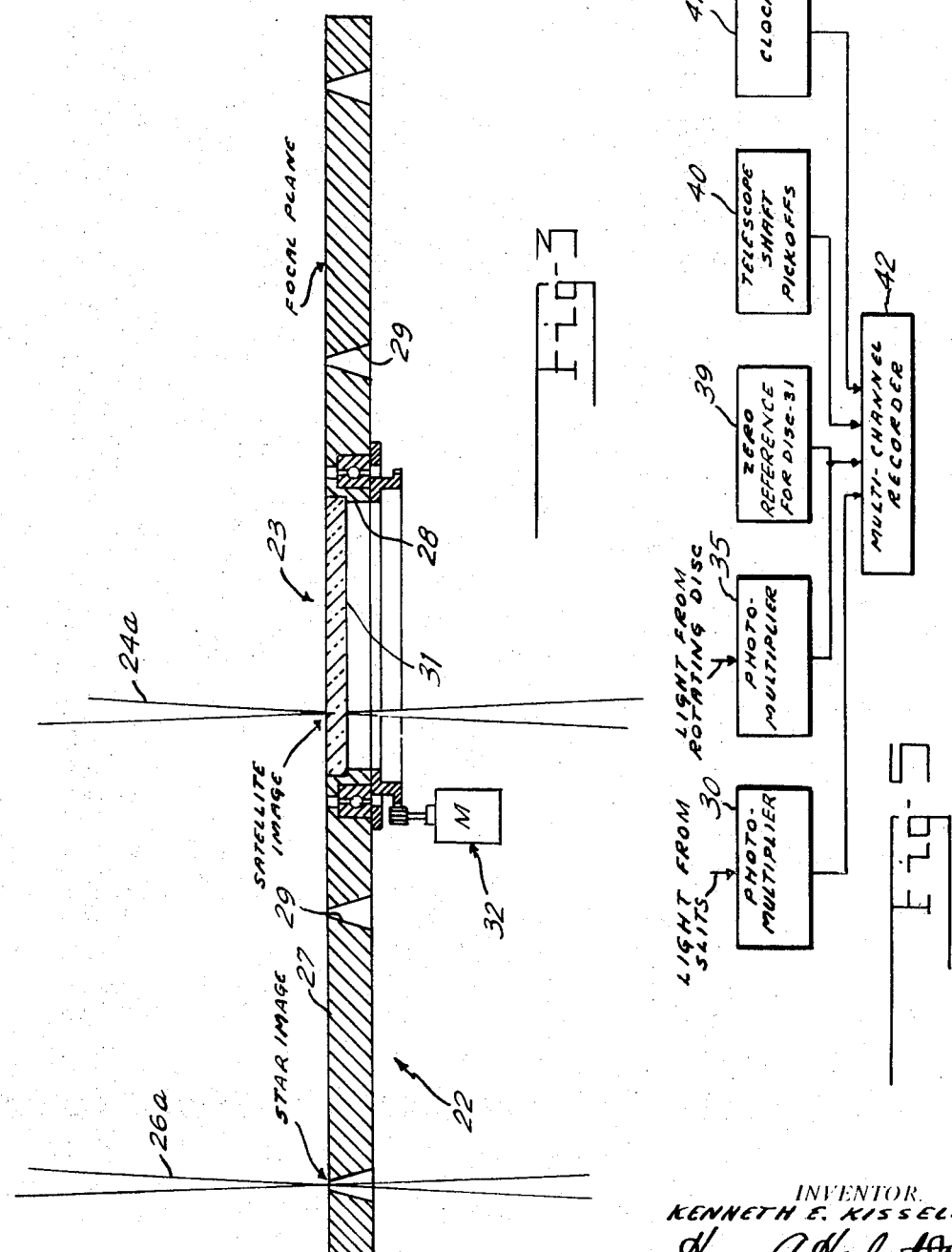
FIG. 3 is a diagrammatic, and partly schematic view, more clearly showing the spatial relationships between the first and second optical and photomultiplier detector systems of the invention.

In this regard, incoming light rays at 25a and 26a in the form of converging pencil beams have been depicted in FIG. 2 as being reflected from a pair of background stars at 25 and 26. In the view of FIG. 3, however, only the incoming light rays 26a are illustrated for the selected background star 26, in addition to the reflected rays 24a coming from the target-satellite 24.

In the aforementioned FIG. 1, a photometer, at 20, is shown mounted to the bottom portion of the skeleton or open frame member 16 at the focus 19 of the telescope 10. Such a photometer 20 may, of course, be used for brightness level studies. However, with the use of the telescope 10 for the purpose of the present invention, photometer 20 may be easily removed and replaced by the combined improved and novel star and target-satellite-detecting assembly of the instant invention, illustrated generally at 21 in FIGS. 2 and 3. Suitable bracket and/or other mounting means may be used to mount the combined assembly 21 to the bottom of the telescope frame member 16 for simultaneous movement therewith when the telescope 10 is used to track a satellite. The said mounting means is not shown, since the specific details thereof are unimportant to the present invention.

The said combined detecting assembly 21 includes a pair of subassemblies; namely, the star-detector device at 22, and the target-satellite-detector device at 23. These two devices 22, 23 act in concert to accurately locate the orbital position of an earth satellite, such as that indicated schematically at the previously referred to reference numeral 24 in FIG. 2. For this purpose, said star-detector device 22 consists of a masking element at 27 fixedly mounted to the bottom of the telescope frame member 16, for example, by appropriate bracket mounting means (not shown), a first, photomultiplier detector, indicated in schematic form at the reference numeral 30, and a pair of mirrors at 37 and 38, interposed between the masking element 27 and said first, photomultiplier detector 30. Said masking element 27 incorporates a central aperture at 28 which is positioned at the focus 19 of the telescope 10 directly behind the primary mirror 18, and a series of relatively elongated slits at 29 arranged in an M-shaped configuration for a purpose to be hereinafter described in detail.

Figure 4:
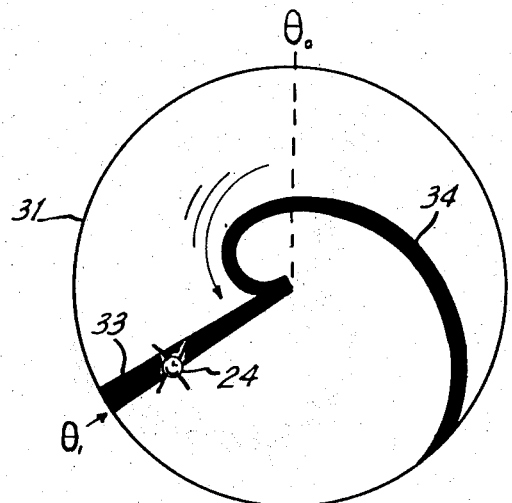
FIGS. 4 and 4a respectively represent partially schematic plan views, illustrating two positions of the novel rotatable occulter, target-detector disc unit used in novel combination with the star-detector portion of the invention shown in detail in FIG. 2.
Figure 4A:
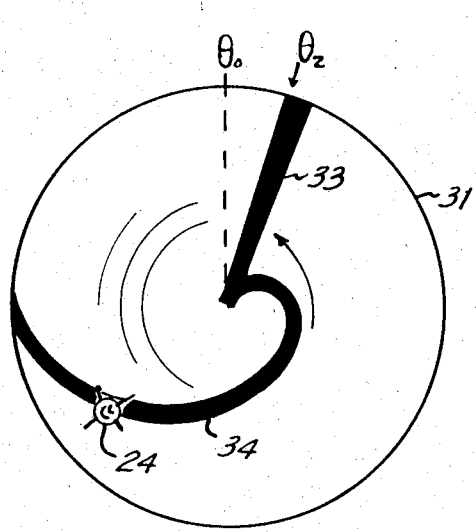

The previously referred to target-satellite-detector device 23 consists principally of a rotatable disc element at 31, and a second, photomultiplier detector, indicated in schematic form at 35 as being placed directly at the rear of the central aperture 28. Said disc element 31 may be substantially located at the telescope focus 19, as particularly depicted in FIG. 2, and mounted thereat for rotation at a predetermined rate, such as 10 revolutions per second (r.p.s.), by means of a motor-drive means, such as that indicated generally at 32. The novel feature of said disc element 31 is that it is made transparent except for the incorporation thereon of a pair of relatively opaque bands; namely, a radial occulter band at 33 and an Archimedean spiral occulter band at 34, as seen particularly in FIGS. 4 and 4a. With this arrangement, which constitutes what is, in effect, a rotating graticle system, rotation of the aforementioned disc element 31 at the previously noted 10 r.p.s. will result in the light normally reflected from the target-satellite 24, and being transmitted to the second photomultiplier detector 35 (Note FIGS. 2 and 3), being periodically interrupted by both the radial and spiral bands 33, 34 for a unique purpose to be hereinafter described in detail.

When the previously mentioned telescope 10 is aimed at a target-satellite in earth orbit, such as that indicated at 24 in FIG. 2, the aforementioned star and target-satellite-detecting assembly 21 is uniquely utilized in the following manner, first, to initially determine the precise location of a selected background star in relation to its image position on the measuring instrument of the present invention, and thereafter, accurately locate the orbital position of the aforesaid target satellite 24 relative to the previously determined position of the star. Of course, for this purpose, the satellite 24 must be in sunlight while the sky is sufficiently dark at the telescope 10 to enable the detection of such background stars against sky brightness. During this tracking operation, light representing the images from background stars, such as at 25 and 26, whose apparent positions lie near the satellite 24 and fall within the same field of view, will be successively intercepted by, and passed through, the four slits 29, constituting the previously noted M-shaped slit configuration of the said masking element 27, to the first, photomultiplier detector 30 by way of the previously described mirrors at 37 and 38. For this purpose, the said M-slit configuration is oriented so that the end pair of slits 29 are normal to the tracking direction. Receipt of these successive beams of light at the said first, photomultiplier detector 30 will, of course, produce pulses from said detector 30 corresponding thereto and, by recording the average time of the inner light pulses and the outer light pulses, the path and the position of the image of the selected background star 25 or 26 relative to the M-slit configuration of the masking element 27, or, in other words, the exact time at which light representing the image of the selected star passes midway through the M-slit configuration may be easily determined. Likewise, the exact lateral position of the selected star image, relative to the ends of the slits, may be then computed from the proportional time between the inner and outer light pulses. It is noted that the use of such a M-slit system is not per se novel, since such an arrangement has already been utilized in the past to time the passage of a spacecraft across a fixed telescope. The Unique feature of the present system resides in the use of the M-slit configuration 29 of the masking element 27 with the novel rotating disc graticle system element 31. The use of the M-slit configuration 29 will result in the location of the image of the selected star, 25 or 26, on the M-slit configuration of the present invention to within an accuracy of ±2 −3 arc seconds. Of course, a record of the various shaft position of the telescope tracing mount 11 may be had by electrical readout means (likewise not specifically shown since it forms no part of the present invention) and, by reference to star tables, the precise star being used may be quickly identified, if not already known. Furthermore, the electrical signals or pulses from the second, photomultiplier detector 35 may be either recorded on a magnetic tape for analysis a short while later, or introduced directly into a small digital computer to provide for the quick and accurate determination of the positions of the target-satellite 24, relative to the known star, in real-time, without any requirement for the intervening use of the photographic process.

The above-mentioned disc element 31, which constitutes a rotating graticle system mounted at the focal plane aperture 28, is unique in that, as it rotates at, for example, the previously noted 10 r.p.s., it interrupts the image of the target-satellite 24, as previously noted, and, in this manner, intermittently prevents reflected light from the target-satellite 24 from reaching the said second, photomultiplier detector 35, which is located behind the central aperture 28 as hereinbefore noted. For this purpose, as seen particularly in FIGS. 4 and 4a, the previously mentioned radial occulter band graticle 33 interrupts light being received at the disc element 31 at all points on a given radial line, on which the image of the satellite 24 would lie, at the same instant. The angular position of this radial line may be easily measured, from the reference or zero position thereof as denoted at $\theta_0$, at least once per revolution by any suitable electromechanical means (not shown). The radial line on which the satellite 24 lies at the time of interruption (See FIG. 4) may be determined from the elapsed time interval between the passage of the radial occulter graticle band 33 from the aforementioned reference or zero position $\theta_0$, to its passage over the satellite image at 24 at the interrupted position, indicated at $\theta_1$.

The aforementioned rotating graticle system of the disc element 31 further comprises the previously referred to Archimedean spiral occulter band graticle 34. The latter also interrupts light representing the image the satellite 24, but this interruption occurs at a successively later time for each radial position, as the said disc element 31 is rotated, in this case, in the counterclockwise direction. The time interval occuring between the light interruptions by the radial occulter band graticle 33 and the Archimedean spiral occulter band graticle 34, as denoted in FIGS. 4 and 4a, respectively, by the change in the angle thereof from $\theta_1$ to $\theta_2$, which time interval becomes quickly determinable from the use of the second, photomultiplier detector 35, may then be interpreted, by a simple arithmetical computation, as the actual radial distance of the reflected image of the satellite 24 from the center of the disc element 31 which also corresponds to the center of the central aperture 28. Then, by comparing this computed position of the orbiting target-satellite 24 with the previously determined position of the selected background star, as at 25 or 26 (FIG. 2), which was found relative to the M-slit configuration of the masking element 27, the actual position of the satellite 24 may then be accurately located relative to the position of the precisely located selected background star.

Thus, a new and improved means of accurately locating the position of a satellite in earth orbit by reference to background stars has been developed by the present invention. In this regard, by continuously rotating the novel disc element 31 of the new occulting graticle system of the present invention at the given 10 r.p.s., for example, a history or in other words, successive orbital positions of the target-satellite 24 may be quickly determined, for every 100 milliseconds, even if only one spiral band, as at 34, is used. Naturally, a greater number of positions of the satellite 24 may be determined by the present method at less time intervals if more than one spiral band, as at 34, of the disc element 31 is utilized. Of course, with the use of the improved four-axis satellite-tracking mount, as at 11, the location of the image of the target-satellite 24 will always remain at some position within the central aperture 28 and, therefore, its accurate position determination is assured.

To achieve a continuous record of the positions of both the target-satellite 24 and the selected background star 25 or 26, for example, so that the exact location of each may be determined at any given instant, and, therefore, the orbital position of the satellite may be definitely located relative to the said star, the signals produced by both of the previously described photomultipliers 30 and 35 may be recorded by a multichannel recorder, such as is shown schematically at 42 in FIG. 5. Likewise, signals representing the zero reference position for the radial line 33 of the rotating graticle disc element 31, as seen at 39, and also the various shaft positions of the telescope tracking mount 11, as represented at 40, may also be fed to the said multichannel recorder 42. Thus, the output pulses due both to the rotating occulter disc element 31, the M-slits 29, and the signals representing both the tracking mount shaft positions, as well as the zero reference positions of the said disc element may be recorded by the recorder 42 against a common time base. For the lateral purpose, the clock represented at 41 in the aforesaid FIG. 5, may be utilized. In this manner, the achievement of a continuous history of the orbital positions of the target-satellite relative to that of the selected background star may be assured.

I claim:

1. In a satellite-tracking telescope having sufficient focal length and having means for tracking the approximate orbital position of a space vehicle; means for determining the orbital position of a space vehicle in earth orbit by reference to known background stars whose apparent positions lie instantaneously near the space vehicle position, said means comprising a combined star and target-satellite-detecting assembly adapted to be mounted at the focal plane of the telescope and including a first, star-detector device adapted to be fixedly mounted to the bottom of the telescope frame for simultaneous movement therewith during the tracking thereby of a space vehicle in earth orbit, said first, star-detector device comprising a masking element of generally opaque design and having first, light-transmitting means adapted to transmit continuously the reflected light from the satellite being tracked and second, built-in means for sequentially intercepting and transmitting light originating from one or more background stars momentarily included in the same field of view as the space vehicle being tracked, and first photosensitive mans positioned to sequentially receive the said star light and generate signals at periodic intervals in response thereto and thereby provide an accurate indication of the position of the image of a selected background star on said masking element by averaging the elapsed time between the receipt of the first and last signals resulting from the sequential light transmission from said second, built-in means in a particular sequence thereof; said star and target-satellite-detecting assembly further including a second, target-satellite-detector device adapted to be rotatably mounted at the first, light-transmitting means of said star-detector device and having second, light-transmitting means adapted to normally receive and transmit reflected light from, and representing the image of the target-satellite being tracked, and second, photosensitive means positioned to receive the reflected light transmitted by said second light-transmitting means and thereby operate a substantially continuous signal in response to the light received; said second, light-transmitting means further having second, built-in means for sequentially interrupting light reflected from said target-satellite on at least two time intervals and thereby intermittently breaking the signal being substantially continuously generated from said second, photosensitive means from the almost uninterrupted transmission of reflected light thereto, the time intervals between the sequential interruptions of transmitted light reflected from said target-satellite constituting an accurate measure of the distance and direction of the target-satellite image from the center of said second, target-satellite-detector device to thereby accurately locate the orbital position of the space vehicle relative to the position of the selected background star already located by the operation of said first, star-detector device.

2. In a satellite-tracking telescope as in claim 1, wherein said masking element incorporates a plurality of relatively elongated and narrow light-transmitting slits for periodically transmitting light reflected from said background stars to said first, photosensitive means.

3. In a satellite-tracking telescope as in claim 2, wherein said plurality of light-transmitting slits are arranged in an M-shaped configuration to thereby transmit in timed sequence a series of four pulses to said first, photosensitive means, the time interval between said first and last pulses providing an accurate measure of the position of the image of a selected background star of said masking element.

4. In a satellite-tracking telescope as in claim 1, wherein said masking element incorporates a central aperture positioned at the focus of the telescope.

5. In a satellite-tracking telescope as in claim 4, wherein said second, target-satellite-detector device further comprises a rotatable transparent disc element adaptable to be mounted at, or adjacent to, the said central aperture of said masking element.

6. In a satellite-tracking telescope as in claim 1, wherein said first, star-detector device comprises a fixedly mounted masking member having a central aperture in direct alignment with the optical axis of said telescope and a plurality of slits formed in an M-shaped configuration for sequentially transmitting intrinsic light from at least one background star, whose image is simultaneously viewable with that of the satellite being tracked, to said first, photosensitive means.

7. In a satellite-tracking telescope as in claim 6, wherein said second, target-satellite-detector device comprises a rotating graticle member positioned at the central aperture of said masking element and adapted to intermittently interrupt light reflected from the satellite being tracked and normally transmitted to said second, photosensitive means and thus periodically prevent the usual generation of signals therefrom at timed intervals representing the accurate measure of the orbital position of said satellite relative to the center of said graticle member.

8. In a satellite-tracking telescope as in claim 7, wherein said rotating graticle member comprises a transparent disc element having opaque bands for effecting the said intermittent interruption of reflected light from said satellite.

9. In a satellite-tracking telescope as in claim 8, wherein said rotating graticle member comprises a substantially transparent rotatable disc element positioned at the central aperture of said first, star-detector device and generally transmitting light to said second, photosensitive means, said disc element further incorporating an opaque radial band and at least one Archimedean spiral band periodically and sequentially interrupting reflected light from said satellite to said second, photosensitive means at timed intervals from which the radial distance location of the image of said satellite from the center of said disc element may be computed.

10. In a satellite-tracking telescope as in claim 1, wherein said first, star-detector device comprises a masking member having a central, light-receiving and transmitting opening immediately at the focus of said telescope and a plurality of relatively elongated slits formed in an M-shaped configuration in said masking member for intermittently receiving and transmitting light pulses from a selected background star, and a first photomultiplier detector positioned to receive the series of light pulses from said plurality of slits and generate timed signals corresponding thereto and from which the position of the image of said background star on said M-slit configuration at a particular instant, may be determined; and said second, target-satellite-detector device comprises a transparent disc member adapted to be mounted at the central opening of said first, star-detector device and being further rotatable at a predetermined rate and incorporating opaque radial and spiral lines for interrupting the transmittal of reflected light from said satellite to a second, photomultiplier detector at timed intervals from which the precise location of the satellite image at a radial distance from the center of said disc member may be determined.

11. In combination with a satellite tracking telescope, apparatus for determining the apparent position of a tracked satellite relative to an identifiable star at any instant, said apparatus comprising: an opaque plate attached to and fixed relative to said telescope with one of its surfaces in the focal plane of the telescope, said plate having a circular opening centered on the optical axis of the telescope and also having a configuration of light transmitting slits some normal to the tracking direction and some oblique thereto, said configuration having mirror symmetry with respect to an axis in the focal plane surface of said plate passing through the center of said circular opening and normal to the tracking direction; a transparent disc in and concentric with said circular opening with one of its faces in said focal plane; a pair of opaque stripes on the focal plane face of said disc, one stripe having an edge extending radially from the center to the periphery of the disc and the other having an edge extending from the center to the periphery of the disc along an Archimedean spiral; means for rotating said disc about its center at constant speed; a first photoelectric transducer receiving light passing through said slits; a second photoelectric transducer receiving light passing through said rotating disc; means generating a reference signal at each passage of said disc through a predetermined reference angular position; means generating signals representing the pointing direction of the telescope; and means for recording the outputs of said photoelectric transducers, said disc reference signal, and said telescope direction signals along a common time axis.